United States Patent [19]

Church et al.

[11] Patent Number: 4,504,880
[45] Date of Patent: Mar. 12, 1985

[54] INTEGRATED MAGNETIC RECORDING HEAD ASSEMBLY INCLUDING AN INDUCTIVE WRITE SUBASSEMBLY AND A MAGNETORESISTIVE READ SUBASSEMBLY

[75] Inventors: Mark A. Church, Los Gatos, Calif.; Stephen K. Decker, Edina, Minn.

[73] Assignee: International Business Machines Corporation, Armonk, N.Y.

[21] Appl. No.: 407,007

[22] Filed: Aug. 9, 1982

[51] Int. Cl.³ .............................. G11B 5/12; G11B 5/30
[52] U.S. Cl. .................................................. 360/113
[58] Field of Search ............... 360/113, 111, 123, 125, 360/126, 127, 120, 122, 119; 324/249; 338/32 R; 235/492, 493, 494, 459

[56] References Cited

U.S. PATENT DOCUMENTS

| | | | |
|---|---|---|---|
| 4,242,710 | 12/1980 | Hempstead | 360/113 |
| 4,315,291 | 2/1982 | Lazzari | 360/125 |
| 4,423,451 | 12/1983 | Chi | 360/113 |
| 4,458,279 | 7/1984 | Katz | 360/123 |

OTHER PUBLICATIONS

IBM Tech. Discl. Bull., vol. 18, No. 1, Jun. 1975, p. 24, entitled "Magnetoresistive Magnetic Head", by S. H. Smith.

1981 Intermag. Conference paper entitled "High Track Density, Coupled-Film D Magnetoresistive Head" by G. V. Kelley et al.

Primary Examiner—Robert M. Kilgore
Attorney, Agent, or Firm—N. N. Kallman

[57] ABSTRACT

An integrated read/write head assembly incorporates a thin film inductive write head subassembly comprising first and second pole pieces that define a write transducing gap, and a magnetoresistive read subassembly disposed in the write gap. The first write pole piece is extended so as to provide a planar conductive path from the terminal connections or studs to the magnetoresistive read subassembly, thereby forming a uniform surface for deposition of the magnetoresistive read subassembly.

8 Claims, 8 Drawing Figures

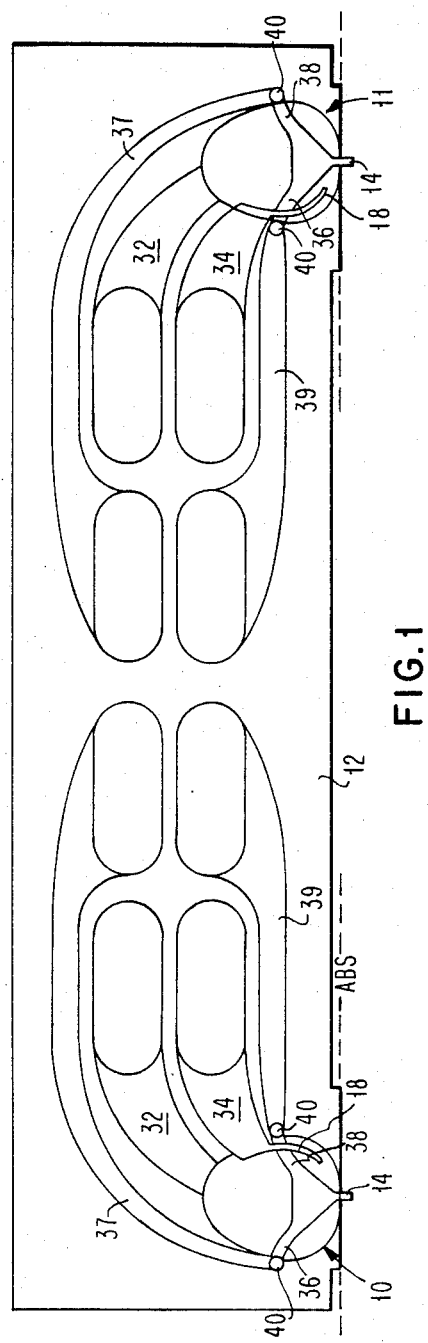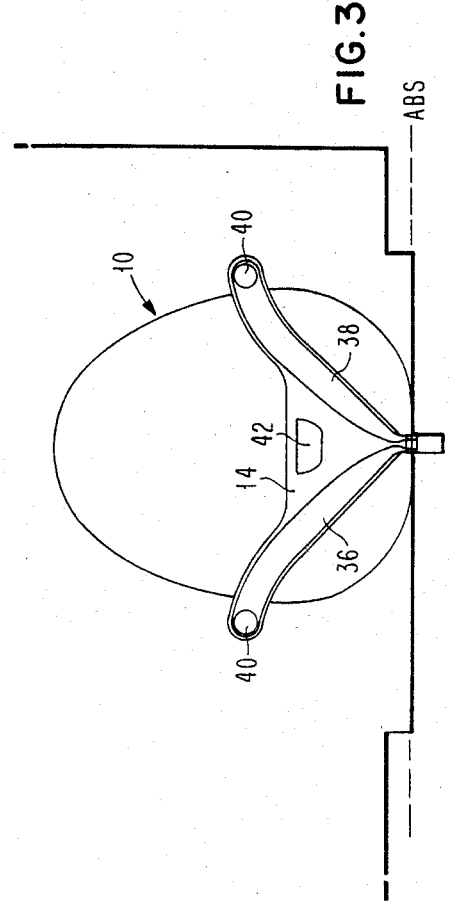

INTEGRATED MAGNETIC RECORDING HEAD ASSEMBLY INCLUDING AN INDUCTIVE WRITE SUBASSEMBLY AND A MAGNETORESISTIVE READ SUBASSEMBLY

DESCRIPTION

TECHNICAL FIELD

This invention relates to an integrated read/write head assembly having a thin film inductive write element and a magnetoresistive read element.

BACKGROUND ART

In data recording technology as presently known, there is a continuing effort to increase data bit packing density and track density. To this end, the magnetic heads and particularly their transducing gaps used for reading and writing have been made smaller in length and width in order to be able to process shorter wavelength or higher frequency data. Thus, thin film heads such as disclosed in U.S. Pat. No. 4,190,872 are employed in high data density disk files, by way of example. In such type heads, a multiplicity of thin films are deposited on a substrate but are not disposed in completely parallel layers. The thin films are built up in successive layers, but bends or sloping portions appear adjacent to the edges of some of the layers. These bend portions may cause a break in the continuity of a layer, thereby exposing conductive elements to an electrical shorting condition.

In continuance of efforts to enhance read/write heads, a combination of an inductive write thin film head and a magneto-resistive (MR) sensing read head in an integral structure has been proposed. In some types of integral read/write assemblies employing MR sensors as the read element, the MR element is deposited over the first thin film pole piece P1 and on part of the transducing gap layer formed between the P1 pole piece and a second thin film pole piece P2. In such assemblies, it is necessary to make contact to the MR sensor element with highly conductive continuous nonmagnetic films made of gold for example. These conductors are extended from the P1 pole piece to electrical contacts or terminations. However, in such prior art assemblies the conductors are deposited above the P1 layer and gap layer and are characterized by curved portions that are prone to break in continuity, thereby causing failure of the head assembly.

A second problem that is encountered with read/write head assemblies of this type involves the shorting of the two conductors that contact the P1 layer. During fabrication of the thin gap layer, the edges of the P1 pole piece layer become exposed, as a result of coverage problems caused by missing insulation in the gap layer. Subsequently, when depositing the MR sensor and conductors, a shorting condition occurs between the P1 layer and these conductors. Consequently, the MR sensor is electrically bypassed by the P1 layer at an overlapping area, so that the device is not operable.

Another problem that occurs in magnetic head assemblies having MR sensors is that of contact resistance between these conductors and the MR sensor. The conductors define the track width of the MR read sensor. The area directly beneath the conductors on the gap surface is the contact area. The MR sensor stripe breaks its continuity at the edge of the P1 layer that defines one side of the contact, whereas the conductor width plus any misregistration, defines the other side of the contact. A limited contact area causes variations and increases in resistance that degrade the performance or cause failure of the magnetic head assembly.

BRIEF DESCRIPTION OF THE DRAWINGS

The invention will be described in detail with reference to the drawings in which:

FIG. 1 is a rear elevation view of an air bearing head slider that is formed with integral head assemblies in accordance with this invention;

FIG. 3 depicts a portion of the head assembly of FIG. 2 for clarity and explanation of the invention;

Similar numerals refer to similar elements throughout the drawing.

DISCLOSURE OF THE INVENTION

Figure 4:
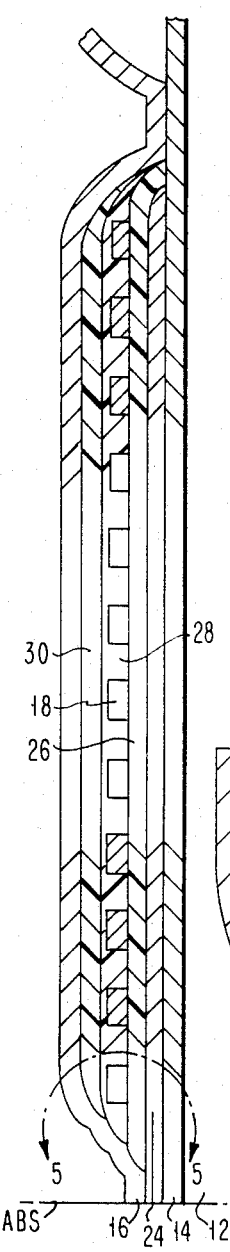
FIG. 4 is a sectional view taken along line A—A of FIG. 2.
Figure 7:
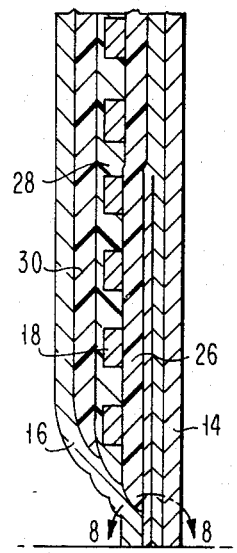
FIG. 7 is a sectional view taken along line B—B of FIG. 2.
Figure 8:
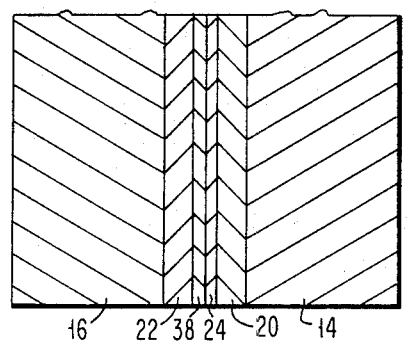
FIG. 8 is an expanded view of the section 8—8 of FIG. 7.
Figure 5:
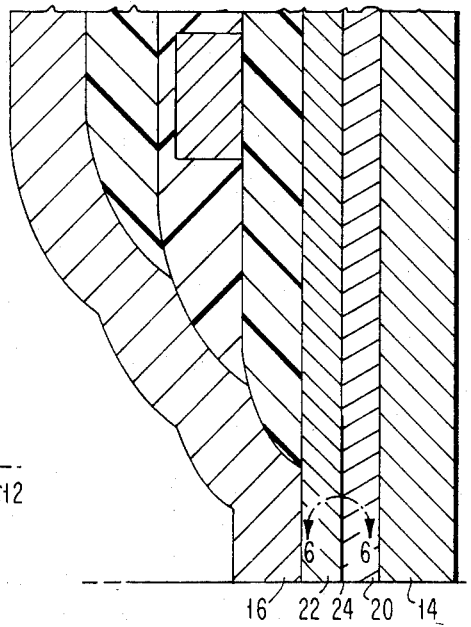
FIG. 5 is an expanded view of the section 5—5 of FIG. 4.

In a preferred implementation of the invention, integrated thin film inductive write and MR read head assemblies 10 and 11 are disposed at the trailing end of an air bearing slider 12, as illustrated in FIG. 1. The inductive write subassembly of each head assembly comprises Permalloy pole pieces P1 and P2, designated by reference numerals 14 and 16 respectively in FIGS. 4 and 5, and an electrical coil 18 formed of several elliptical-type turns. The transducing gap of the thin film write element is formed of two adjacent insulator gap layers 20 and 22 disposed between the pole pieces 14 and 16. Between the two gap layers 20 and 22, which may be made of alumina by way of example, is a read subassembly that includes an MR sensor stripe 24 as the read element of the integrated assembly.

The head assembly further comprises an insulating layer 26 formed on the gap layer 22. The coil 18 is encompassed by an insulating layer 28 that is deposited over the coil and insulating layer 26. An additional insulating layer 30 is provided on top of the coil 18 and layer 28. The P2 pole piece 16 formed on layer 30 completes the magnetic circuit of the write subassembly. Conductors 32 and 34 are provided to direct the input write signal from a write circuit to the coil 18 of the write subassembly.

The write transducing gap formed between the pole pieces 14 and 16, and the read sensor element 24 are located at the air bearing surface (ABS) of the slider substrate 12 for effective recording and reading of data on a magnetic medium.

Figure 2:
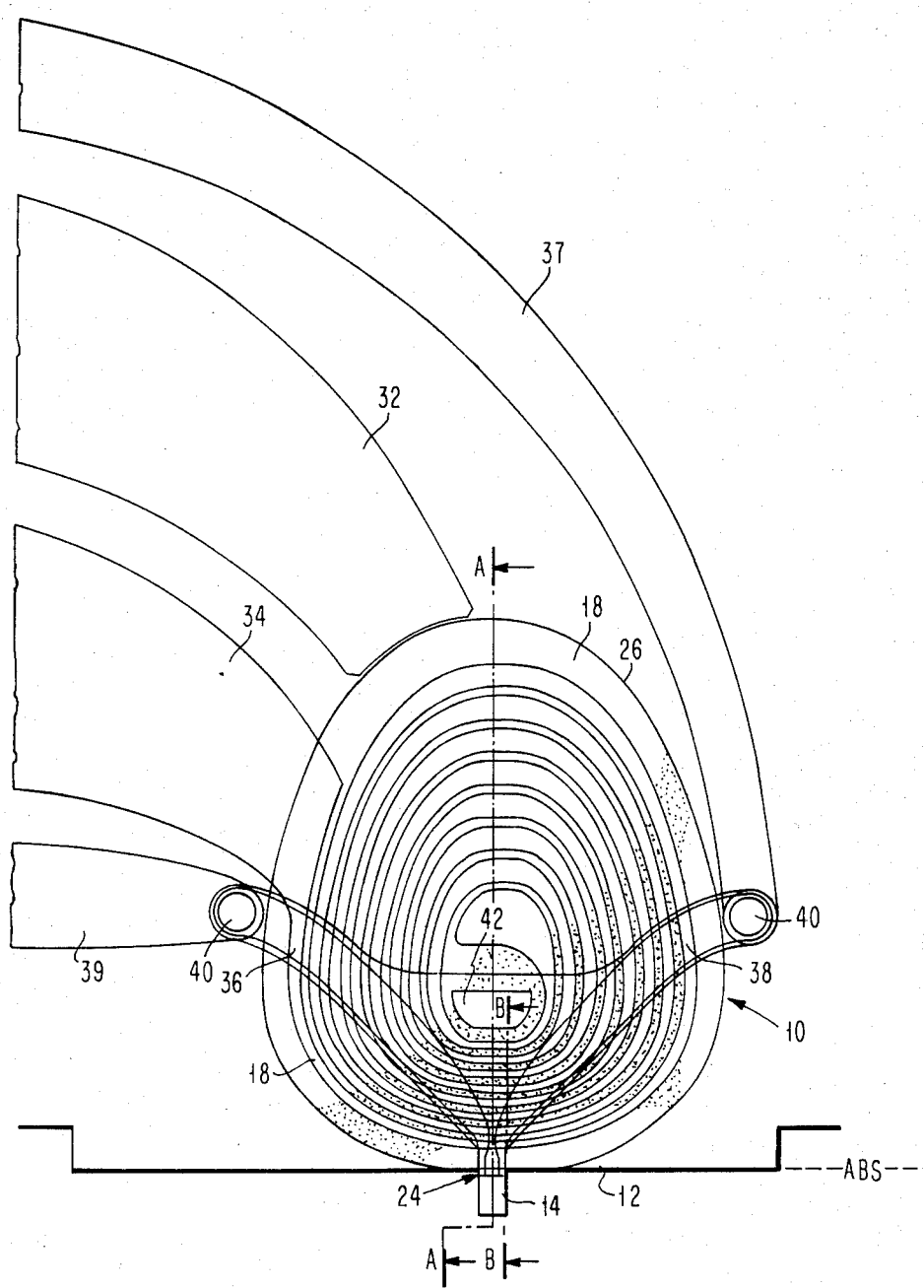
FIG. 2 is a plan section view of an integral head assembly, incorporating a thin film inductive write element and an MR sensor read element in accordance with the invention.

In accordance with this invention, the P1 pole piece structure 14 and an insulating gap structure are extended into a V-like configuration, thereby providing a planar surface on which wing-shaped conductors 36 and 38 are deposited, as depicted in FIGS. 2, and 3. One end of each of the conductors 36 and 38 is connected respectively to the MR sensor element 24 and the other end of each conductor is connected to a termination 40 for directing the signals representing recorded data sensed by the MR element to readout circuitry.

The conductors 36 and 38 are deposited as coplanar flat surfaces and extend beyond the periphery of the gap layer 20 and the gap layer 22, thereby enabling contact between the MR sensor element 24 and the conductors 36 and 38.

Figure 6:
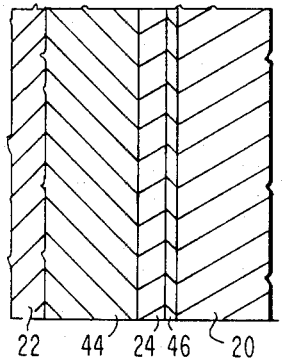
FIG. 6 is an expanded view of the section 6—6 of FIG. 5.

The MR subassembly also includes a bias layer 44 which may be made of titanium for example. The bias layer is disposed on top of the Permalloy MR sensor element, one being illustrated in the section view of FIG. 6. An adhesion layer of titanium 46 is utilized to enable joining of the MR subassembly to the first deposited gap layer 20. The bias layer 44 establishes the electrical current conditions in relation to the height and thickness of the MR sensor stripe, as is known in the art.

This invention provides an extension of the P1 pole structure 14 so that a planar conductor path is realized from the MR sensor 24 to the terminations 40, thereby forming a uniform surface on which the MR sensor subassembly is deposited. By virtue of this design, the problems of discontinuous conductors and shorting to the P1 layer 14 is effectively eliminated. As the geometry of the P1 pole structure 14 is not changed in the area of the magnetic flux path from the back gap closure 42 to the P1 and P2 pole tips, the write performance is not affected.

In an implementation of the invention, the length of the write gap was made to be less than 2 microns, and each of the P1 and P2 pole structures 14 and 16 was respectively about 2.5 microns in thickness. All of the MR sensor material lies within the write transducing gap formed by gap layers 20 and 22. Thus, there is no shorting problem between the P1 pole structure 14 and the MR sensor 24. Furthermore, the P1 pole piece 14 and the P2 pole piece 16 act as shields for the MR read sensor.

With very small head assembly dimensions, of the order of 2-3 microns for the elements as set forth above, the problems recited supra that normally would occur, were rectified. These problems do not generally appear with much larger transducing gaps and with the use of relatively thick insulating layers, as utilized previously in thin film head assemblies. But thick insulators result in poor resolution and limit data processing to longer wavelengths, i.e., lower data densities.

With the design set forth herein, a uniform area contact is achieved between the MR sensor and the MR conductors. In this way, it is possible to eliminate open circuits and short circuits that may be caused by the depositions of layers on non-planar surfaces. Also, the bilateral symmetry of the design balances the impedance of the two conductors. In addition, manufacturing capacity and product yield are enhanced for high density data processing systems.

What is claimed is:

1. An integrated magnetic head assembly comprising:

an inductive write head subassembly comprising first and second magnetic thin film pole pieces, said pole pieces defining a nonmagnetic transducing gap therebetween, said first pole piece being planar and extended;

a read subassembly having a planar magnetoresistive element disposed in said gap, said element being electrically conductive; and planar conductive elements in electrical contact with said planar magnetoresistive element, said magnetoresistive element and said conductive elements having a planar area circumscribed by the periphery of said extended first pole piece.

2. An integrated magnetic head assembly as in claim 1, wherein said transducing gap comprises two adjacent insulator layers.

3. An integrated magnetic head assembly as in claim 2, wherein said read subassembly is located between said two adjacent insulator gap layers.

4. An integrated magnetic head assembly as in claim 1, further including an air bearing slider for supporting said write and read subassemblies.

5. An integrated magnetic head assembly as in claim 1, wherein said read subassembly comprises a bias layer for determining the electrical current applied to said magnetoresistive element.

6. An integrated magnetic head assembly as in claim 5, wherein said bias layer is made of titanium.

7. An integrated magnetic head assembly as in claim 6, including an adhesion layer of titanium deposited over said first bias layer, on which adhesion layer said read assembly is deposited.

8. An integrated magnetic head assembly as in claim 1, including an electrical coil structure, a separation insulator layer disposed between said coil structure and said gap layers, and terminations for making electrical contact with said conductive elements at locations beyond the periphery of said separation layer.

* * * * *